UNITED STATES PATENT OFFICE.

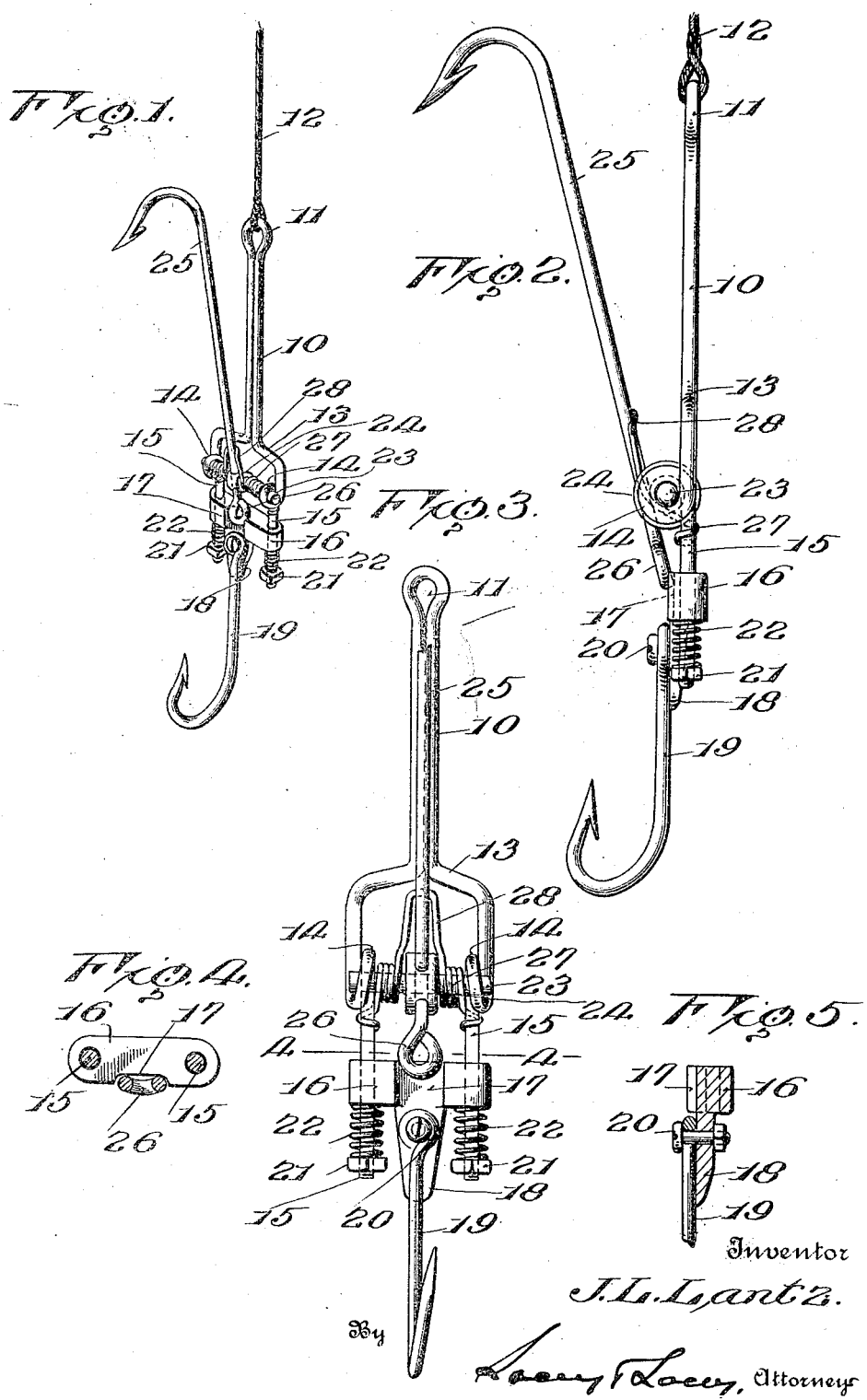

JOHN L. LANTZ, OF ADA, OHIO.

FISH-HOOK.

1,293,127.    Specification of Letters Patent.    Patented Feb. 4, 1919.

Application filed May 13, 1918. Serial No. 234,182.

*To all whom it may concern:*

Be it known that I, JOHN L. LANTZ, a citizen of the United States, residing at Ada, in the county of Hardin and State of Ohio, have invented certain new and useful Improvements in Fish-Hooks, of which the following is a specification.

This invention relates to an improved fish hook and has as its primary object to provide a device of this character employing a bait hook and a spring pressed gaff hook and wherein the said gaff hook will be mounted to swing in a path in front of the bait hook so that the said gaff hook will thus more than likely encounter the body of a fish biting at the bait hook.

The invention has as a further object to provide a construction wherein the bait hook will be mounted upon a supporting slide therefor and wherein the said slide will form a trigger for the gaff hook adapted to hold the said gaff hook set away from the bait hook so that a fish biting at the bait hook will cause the automatic release of the gaff hook.

And the invention has as a still further object to provide an improved mounting for the gaff hook.

Other and incidental objects will appear as the description proceeds. In the drawings wherein I have illustrated the preferred embodiment of the invention, and wherein similar reference characters designate corresponding parts throughout the several views:

Figure 1 is a perspective view showing my improved hook set,

Fig. 2 is a side elevation on an enlarged scale, particularly illustrating the manner in which the supporting slide for the bait hook is adapted to form a trigger for the gaff hook holding the latter hook away from the bait hook, Fig. 3 is a fragmentary front elevation of the hook, Fig. 4 is a transverse sectional view taken on the line 4—4 of Fig. 3, and particularly showing the seat formed in the supporting slide of the bait hook for receiving the inner end of the gaff hook, and Fig. 5 is a fragmentary sectional view particularly illustrating the mounting of the bait hook upon its supporting slide.

In carrying out the invention my improved hook is formed with a stock 10 which is preferably constructed from a length of suitable wire bent into overlapping relation to provide the stock, the strands of which may, if desired, be secured together by solder or other approved means. At its upper end the stock is provided with an eye 11 for receiving a line, as conventionally shown at 12. At the lower end of the stock the strands thereof are separated and are thence continued to provide a yoke 13. The arms of this yoke, which arms extend in substantially parallel relation, are bent to define oppositely disposed bearing loops or eyes 14 and from the said loops are thence continued to provide guide arms 15. Extending between these arms and slidable longitudinally thereon, is a slide 16 recessed in its front face, as particularly shown in Fig. 4, to provide a seat 17 and formed upon the lower side thereof with a depending lug 18 located substantially midway between the guide arms. Mounted upon this lug is a bait hook 19 secured to the said lug by a bolt or other suitable fastening device 20 extending, as shown in detail in Fig. 5, through the eye of the hook and through the said lug. The hook will thus be rigidly supported upon the slide in position with its bill extending forwardly with respect to the slide. Threaded upon the lower ends of the guide arms 15 are nuts 21 and interposed between these nuts and the ends of the slide are helical springs 22 surrounding the guide arms. The purpose of these springs will presently appear.

Journaled through the bearing loops 14 of the yoke 13 of the stock is a pivot rod or pin 23 to which is secured at a point substantially midway of its ends, a hub 24. Connected adjacent its inner extremity to this hub is a gaff hook 25. The gaff hook is thus swingingly supported by the pivot rod 23 to travel in a path in front of the bait hook and is of a length to project somewhat below this latter hook when released, the bill of the gaff hook being presented toward the bait hook. At its inner end the gaff hook is formed with an eye 26 adapted to be slidably received within the seat 17 of the supporting slide 16 for the bait hook. Wound around the pivot rod 23 at opposite sides of the hub 24 thereon is a spring 27, the intermediate portion of which is looped to define a laterally projecting spring arm 28 bearing against the rear side of the shank of the gaff hook. The sides of the loop forming the spring arm 28 extend at opposite sides of the gaff hook shank and the bight of the loop is deflected laterally with respect to the said sides, as particularly shown in Fig. 2, to fit around the said shank so that the loop will thus be held against accidental disengagement from the shank. At its ends, the spring is looped around the guide arms 15 immediately below the bearing loops 14 and is thus secured upon the yoke 13. The spring will thus act through its arm 28 upon the gaff hook for constantly urging said hook toward the bait hook.

Attention is now directed to the fact that the springs 22 will normally support the slide 16 for the bait hook in the path of swinging movement of the inner end of the gaff hook. Consequently, when the gaff hook is swung upwardly, as suggested in Figs. 1 and 2, the eye 26 of the gaff hook will engage and depress the slide against the tension of the said springs so that the said eye may move to a position in front of the slide when the said springs will immediately act to again shift the slide upwardly to its normal position in the rear of the said eye and engage the eye within the seat 17 of the slide. The purpose of these springs 22, therefore, now becomes apparent, and it will be seen that the said springs will act upon the slide for automatically locking the gaff hook in set position, as shown in Figs. 1, 2 and 3 of the drawings, away from the bait hook. When the hook is thus set, it will be seen that a fish biting at a bait upon the bait hook will pull downwardly upon this hook and thus shift the slide 16 to release the gaff hook when the spring arm 28 will quickly shift this latter hook to plunge it into the body of the fish. An automatic release for the gaff hook is thus provided and it will be seen that since the gaff hook is mounted to travel in a path in front of the bait hook, said gaff hook will, when so released, more than likely encounter the body of the fish for effecting a catch.

Having thus described the invention, what is claimed as new is:

1. A device of the character described including a stock, a yoke formed therefrom, a slide shiftable upon the yoke, a bait hook carried by the slide, and a gaff hook swingingly mounted upon the yoke and constantly urged toward the bait hook, the slide being movable upwardly upon the yoke to lie in front of the inner end of the gaff hook for holding the gaff hook set away from the bait hook and being operable from the bait hook for releasing the gaff hook.

2. A device of the character described including a stock, spaced guide arms carried thereby, a slide shiftable upon said guide arms, a bait hook carried by the slide, a gaff hook swingingly mounted upon the stock and constantly urged toward the bait hook, and yieldable means engaging opposite ends of the slide for normally sustaining the slide in position adapted to coact with the inner end of the gaff hook for holding the gaff hook set away from the bait hook, the slide being operable from the bait hook for releasing the gaff hook.

3. A device of the character described including a stock, spaced guide arms carried thereby, a slide shiftable upon the said arms, a bait hook carried by the slide, a gaff hook swingingly mounted upon the stock and constantly urged toward the bait hook, and springs surrounding the said guide arms and normally holding the slide projected into the path of swinging movement of the inner end of the gaff hook to coact therewith for locking the gaff hook set away from the bait hook, the slide being operable from the bait hook for releasing the gaff hook.

4. A device of the character described including a stock formed from a length of material having the strands thereof extended at one end of the stock to provide a yoke having the arms thereof bent to define bearing loops, a slide shiftable upon the yoke arms, a bait hook carried by the said slide, a pivot pin journaled in the said loops, and a gaff hook connected with the said pivot pin and constantly urged toward the bait hook, the slide being adapted to coöperate with the gaff hook for locking the gaff hook in set position away from the bait hook and being operable from the bait hook for releasing the gaff hook.

5. A device of the character described including a stock, a yoke carried thereby and having spaced arms, a slide shiftable upon the said arms, a bait hook carried by the said slide, a pivot pin journaled upon the yoke arms, a gaff hook carried by the said pivot pin, and a spring wrapped about the pivot pin and having its intermediate portion looped to provide a spring arm bearing against the gaff hook for constantly urging said hook toward the bait hook, the slide being adapted to coöperate with the gaff hook for locking the gaff hook in set position away from the bait hook and being operable from the bait hook for releasing the gaff hook.

6. A device of the character described including a stock, a slide shiftably supported at its ends from the stock, a bait hook carried by the slide, a gaff hook swingingly mounted upon the stock and constantly urged toward the bait hook, yieldable means engaging the ends of the slide and normally sustaining the slide in the path of movement of the inner end of the gaff hook and adapted to lock the gaff hook set away from the bait hook, the slide being operable from the bait hook for releasing the gaff hook, and means adjustable for tensioning said yieldable means.

7. A device of the character described including a stock having spaced guide arms, a slide shiftable upon said arms, a bait hook carried by the slide, a pivot pin journaled upon the arms, a gaff hook carried by the pivot pin, and a spring carried by said pivot pin and coacting with the gaff hook for constantly urging the gaff hook toward the bait hook, the slide being adapted to coöperate with the gaff hook for locking the gaff hook set way from the bait hook and being operable from the bait hook for releasing the gaff hook.

In testimony whereof I affix my signature.

JOHN L. LANTZ. [L. S.]